(12) United States Patent
Ikuno et al.

(10) Patent No.: US 8,937,124 B2
(45) Date of Patent: Jan. 20, 2015

(54) RESIN COMPOSITION AND RESIN MOLDED ARTICLE

(75) Inventors: Masaya Ikuno, Kanagawa (JP); Masahiro Moriyama, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/028,829

(22) Filed: Feb. 16, 2011

(65) Prior Publication Data

US 2012/0041114 A1 Feb. 16, 2012

(30) Foreign Application Priority Data

Aug. 16, 2010 (JP) .................................. 2010-181556

(51) Int. Cl.
| | | |
|---|---|---|
| *C08K 5/5399* | (2006.01) | |
| *C08L 67/04* | (2006.01) | |
| *C08K 5/29* | (2006.01) | |
| *C08L 33/00* | (2006.01) | |

(52) U.S. Cl.
CPC . *C08L 67/04* (2013.01); *C08K 5/29* (2013.01); *C08K 5/5399* (2013.01); *C08L 33/00* (2013.01)
USPC .......................................................... 524/115

(58) Field of Classification Search
USPC ........................................................ 524/115
See application file for complete search history.

(56) References Cited

U.S. PATENT DOCUMENTS

| | | | | |
|---|---|---|---|---|
| 5,973,024 A | * | 10/1999 | Imashiro et al. | 523/124 |
| 7,060,744 B2 | * | 6/2006 | Murakami et al. | 524/116 |
| 2002/0128344 A1 | * | 9/2002 | Fujihira et al. | 522/162 |
| 2004/0242803 A1 | * | 12/2004 | Ohme et al. | 525/400 |
| 2005/0014871 A1 | * | 1/2005 | Chin | 524/99 |
| 2005/0143502 A1 | * | 6/2005 | Yamada et al. | 524/115 |
| 2006/0216805 A1 | * | 9/2006 | Ueda | 435/174 |
| 2007/0270527 A1 | * | 11/2007 | Horie et al. | 524/77 |
| 2008/0262151 A1 | * | 10/2008 | Ishii et al. | 524/599 |
| 2009/0018237 A1 | * | 1/2009 | Fujii et al. | 523/201 |
| 2010/0197842 A1 | * | 8/2010 | Kamikawa | 524/195 |
| 2011/0060080 A1 | | 3/2011 | Kishimoto et al. | |
| 2012/0289625 A1 | | 11/2012 | Matsuno et al. | |
| 2014/0066555 A1 | | 3/2014 | Matsuno et al. | |

FOREIGN PATENT DOCUMENTS

| | | | |
|---|---|---|---|
| JP | A-2005-248032 | | 9/2005 |
| JP | B2-3984440 | | 10/2007 |
| JP | A-2007-308660 | | 11/2007 |
| JP | HO 2008-094878 | * | 4/2008 |
| JP | A-2008-169239 | | 7/2008 |
| JP | A-2010-111737 | | 5/2010 |
| JP | A-2010-111739 | | 5/2010 |
| JP | A-2011-006605 | | 1/2011 |
| JP | A-2011-162651 | | 8/2011 |
| WO | WO2009/041054 | * | 4/2009 |
| WO | WO 2009/125872 A1 | | 10/2009 |
| WO | WO 2010/053167 A1 | | 5/2010 |

OTHER PUBLICATIONS

Machine translation of JP 2008-094878.*
May 21, 2014 Notification of the First Office Action issued in Chinese Application No. 201110070301.8 with English-language translation.
Jul. 4, 2013 Notification of Reasons for Refusal issued in Japanese Application No. 2011-175956 with English-language translation.

* cited by examiner

*Primary Examiner* — Doris Lee
(74) *Attorney, Agent, or Firm* — Oliff PLC

(57) ABSTRACT

A resin composition includes a polylactic acid, a monocarbodiimide compound and a phosphazene.

10 Claims, 1 Drawing Sheet

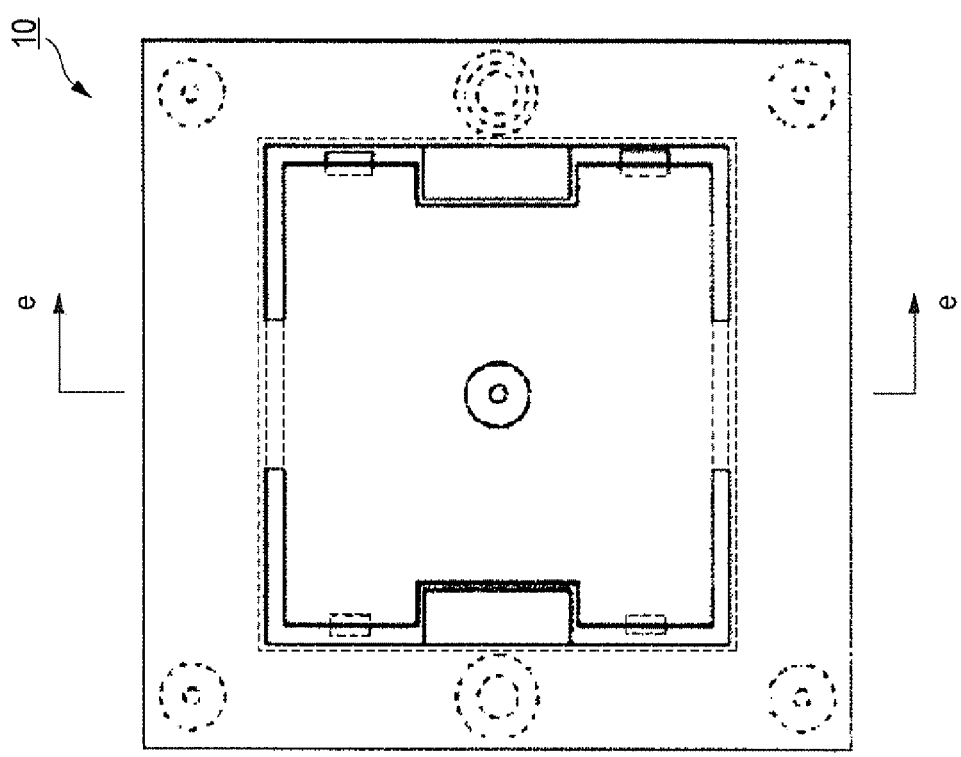

RESIN COMPOSITION AND RESIN MOLDED ARTICLE

CROSS-REFERENCE TO RELATED APPLICATIONS

This application is based on and claims priority under 35 USC 119 from Japanese Patent Application No. 2010-181556 filed on Aug. 16, 2010.

BACKGROUND

1. Technical Field

The present invention relates to a resin composition and to a resin molded article.

2. Related Art

In electrical appliances and parts of electronic or electrical instruments, polymer materials such as polystyrenes, polystyrene-ABS resin copolymers, polycarbonates, polyesters, polyphenylene sulfides and polyacetals are used because they are excellent in heat resistance, mechanical strength and so on, and in particular, in the case of parts of electronic or electrical instruments, they are excellent in maintenance of mechanical strength against environmental changes and so on.

Also, in recent years, from the viewpoints of environmental issues and so on, there are known resin compositions containing a polylactic acid resin which is a kind of biodegradable polymers and molded articles obtained using such a resin composition.

SUMMARY

According to an aspect of the invention, there is provided a resin composition comprising a polylactic acid, a monocarbodiimide compound and a phosphazene compound.

BRIEF DESCRIPTION OF THE DRAWING

FIG. 1A is a front view showing a test piece used for a steel ball drop test in the Examples of the invention; and FIG. 1B is an e-e sectional view in FIG. 1A, wherein 10 denotes a test piece

DETAILED DESCRIPTION

Exemplary embodiments of the invention are hereunder described. The present exemplary embodiments are an example for carrying out the invention, and it should not be construed that the invention is limited to the present exemplary embodiments.

[Resin Composition]

A resin composition according to the exemplary embodiment of the invention includes a polylactic acid, a monocarbodiimide compound and a phosphazene compound. It may be considered that when the monocarbodiimide compound and the phosphazene compound are added to the polylactic acid, the monocarbodiimide compound is bound to a terminal group (for example, a carboxyl group or a hydroxyl group) of the polylactic acid, whereby extension of a molecular chain is caused, and a molecular motion of the terminal group of the polylactic acid is promoted by a plasticization effect of the phosphazene compound, whereby the reactivity between the terminal group of the polylactic acid and the monocarbodiimide compound is enhanced. As a result, it may be considered that the elongation of the resin itself is enhanced, so that when the resin composition according to the present exemplary embodiment is used, an enhancement of the steel ball drop test characteristic in a resin molded article containing a polylactic acid, achievement of which enhancement is difficult in the conventional technologies, is realized.

<Polylactic Acid>

As the resin in the present exemplary embodiment, a polylactic acid is suitable. The polylactic acid is derived from vegetables and has an effect for reducing an environmental load, specifically a reducing effect of emissions of $CO_2$ and a reducing effect of the amount of oil used. The polylactic acid is not particularly limited so far as it is a condensate of lactic acid. The polylactic acid may be poly-L-lactic acid (hereinafter also referred to as "PLLA") or poly-D-lactic acid (hereinafter also referred to as "PDLA") or may be a compounded material thereof through copolymerization or blending; and furthermore, the polylactic acid may be stereo-complex polylactic acid (hereinafter also referred to as "SC-PLA") with high heat resistance, which is a mixture of poly-L-lactic acid and poly-D-lactic acid and in which helical structures thereof are well meshed with each other.

As the polylactic acid, a synthesized material may be used, or a commercially available material may be used. Examples of the commercially available material include "TERRAMAC TE4000", "TERRAMAC TE2000" and "TERRAMAC TE7000", all of which are manufactured by Unitika Ltd.; and "LACEA H100", manufactured by Mitsui Chemicals, Inc. Also, the polylactic acid may be used singly or in combinations of two or more kinds thereof. In the present exemplary embodiment, the polylactic acid is contained as a main component of the resin composition. The "main component" as referred to herein means that its content exceeds 50% by mass relative to the whole amount of the resin composition.

A molecular weight of the polylactic acid is not particularly limited. However, in the present exemplary embodiment, a weight average molecular weight of the polylactic acid is preferably 8,000 or more and 200,000 or less, and more preferably 15,000 or more and 120,000 or less. When the weight average molecular weight of the polylactic acid is less than 8,000, a burning rate of the resin composition becomes fast, and a low-temperature mechanical strength tends to be lowered. On the other hand, when the weight average molecular weight of the polylactic acid exceeds 200,000, flexibility is lowered, and drip self-extinguishing properties of the resin composition are lowered. In all of these cases, flame retardancy tends to be lowered. It is meant by the terms "self-extinguishing properties" that the resin composition drips by heat and vanishes.

The weight average molecular weight of the polylactic acid in the resin composition means a weight average molecular weight determined by cooling the resin composition in a liquid nitrogen atmosphere, shaving off a sample for measurement from its surface, dissolving the sample for measurement in a concentration of 0.1% by mass in deuterated chloroform and measuring the separated polylactic acid by a gel permeation chromatograph. Also, for the measurement, "HLC-8220GPC", manufactured by Tosoh Corporation is used as the gel permeation chromatograph.

In this specification, the terms "from A to B" or the like expressing a numerical value range are synonymous with "A or more and B or less".

In the present exemplary embodiment, though a content of the polylactic acid is not particularly limited, it is preferably from 30% by mass to 90% by mass or from about 30% by mass to about 90% by mass, and more preferably from 50% by mass to 80% by mass or from about 50% by mass to about 80% by mass on the basis of the whole amount of solids of the resin composition. When the content of the polylactic acid is less than 30% by mass or less than about 30% by mass, there is a concern that the environmental load becomes large; whereas when it exceeds 90% by mass or exceeds about 90% by mass, in the case of forming into a molded article, there is a concern that the mechanical strength is lowered. In the resin molded article, though a content of the polylactic acid is not particularly limited, it is preferably from 30% by mass to 90% by mass or from about 30% by mass to about 90% by mass, and more preferably from 50% by mass to 80% by mass or from about 50% by mass to about 80% by mass on the basis of the mass of the whole of the resin molded article. When the content of the polylactic acid is less than 30% by mass or less than about 30% by mass, there is a concern that the environmental load becomes large; whereas when it exceeds 90% by mass or exceeds about 90% by mass, there is a concern that the mechanical strength is lowered.

<Phosphazene Compound>

The phosphazene compound is not particularly limited so far as it is a compound having a —P═N— bond in a molecule thereof. Examples thereof include chain or cyclic compounds containing the following structural formula (1). In the structural formula (1), each of $R_1$ and $R_2$ independently represents a hydrogen atom, a linear, branched or cyclic alkyl group having a carbon number of from 1 to 10 (for example, a methyl group, an ethyl group, etc.), a linear, branched or cyclic alkoxyl group having a carbon number of from 1 to 10 (for example, a methoxy group, an ethoxy group, etc.), an aryl group having a carbon number of from 6 to 15 (for example, a phenyl group, etc.) or an aryloxy group having a carbon number of from 6 to 15 (for example, a phenyloxy group, etc.); and n is from 3 to 8. In the case of a chain compound, a terminal group thereof is a hydrogen atom. Preferred examples of the phosphazene compound include cyclic phenoxyphosphazenes, chain phenoxyphosphazenes, phenoxyphosphazenes and crosslinked phenoxyphosphazenes. Of these, cyclic phenoxyphosphazenes are preferable from the standpoint of wet heat resistance or the like. It may be considered that when the phosphazene compound is compatibilized with the polylactic acid, a molecular chain motion of the polylactic acid is promoted.

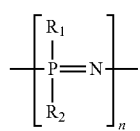

(1)

As the phosphazene compound, a synthesized material may be used, or a commercially available material may be used. Examples of the commercially available material include cyclic phenoxyphosphazenes, for example, FP-100, FP-110 and FP-200 (all of which are a trade name of Fushimi Pharmaceutical Co., Ltd.), SP-100 and SP-100H (all of which are a trade name of Otsuka Chemical Co., Ltd.), etc. Also, the phosphazene compound may be used singly or in combinations of two or more kinds thereof.

Though a content of the phosphazene compound is not particularly limited, it is preferably from 5% by mass to 50% by mass or from about 5% by mass to about 50% by mass, and more preferably from 10% by mass to 40% by mass or from about 10% by mass to about 40% by mass on the basis of the whole amount of solids of the resin composition. When the content of the phosphazene compound is less than 5% by mass or less than about 5% by mass, in the case of forming into a molded article, there is a concern that the steel ball drop test characteristic is lowered; whereas when it exceeds 50% by mass or exceeds about 50% by mass, there is a concern that bleedout is caused. In the resin molded article, though a content of the phosphazene compound is not particularly limited, it is preferably from 5% by mass to 50% by mass or from about 5% by mass to about 50% by mass, and more preferably from 10% by mass to 40% by mass or from about 10% by mass to about 40% by mass on the basis of the mass of the whole of the resin molded article. When the content of the phosphazene compound is less than 5% by mass or less than about 5% by mass, there is a concern that the steel ball drop test characteristic is lowered; whereas when it exceeds 50% by mass or exceeds about 50% by mass, there is a concern that the phosphazene compound bleeds out on the surface of the molded article.

<Monocarbodiimide Compound>

The monocarbodiimide compound is not particularly limited so far as it is a compound having one carbodiimide group. It may be considered that the monocarbodiimide compound allows terminal groups (for example, a carboxyl group, a hydroxyl group, etc.) of the polylactic acid to bond to each other, thereby extending a molecular chain length.

Examples of the monocarbodiimide compound include dicyclohexyl carbodiimide, diisopropyl carbodiimide, dimethyl carbodiimide, diisobutyl carbodiimide, dioctyl carbodiimide, t-butylisopropyl carbodiimide, diphenyl carbodiimide, di-t-butyl carbodiimide and di-β-naphthyl carbodiimide. Of these, dicyclohexyl carbodiimide or diisopropyl carbodiimide is preferable especially from the standpoint of easiness of industrial availability or the like.

As the monocarbodiimide compound, a synthesized material may be used, or a commercially available material may be used. Examples of the commercially available material include "STABAXOL I-LF", manufactured by Rhein Chemie. Also, the monocarbodiimide compound may be used singly or in combinations of two or more kinds thereof.

Though a content of the monocarbodiimide compound is not particularly limited, it is preferably from 0.1% by mass to 10% by mass or from about 0.1% by mass to about 10% by mass, and more preferably from about 1% by mass to about 5% by mass on the basis of the whole amount of solids of the resin composition. When the content of the monocarbodiimide compound is less than 0.1% by mass or less than about 0.1% by mass, in the case of forming into a molded article, there is a concern that the steel ball drop test characteristic is lowered; whereas when it exceeds 10% by mass or exceeds about 10% by mass, since the monocarbodiimide compound is a low-molecular weight component, in the case of forming into a molded article, there is a concern that the flame retardancy is lowered. In the resin molded article, though a content of the monocarbodiimide compound is not particularly limited, it is preferably from 0.1% by mass to 10% by mass or from about 0.1% by mass to about 10% by mass, and more preferably from 1% by mass to 5% by mass or from about 1% by mass to about 5% by mass on the basis of the mass of the whole of the resin molded article. When the content of the monocarbodiimide compound is less than 0.1% by mass or less than about 0.1% by mass, there is a concern that the steel ball drop test characteristic is lowered; whereas when it exceeds 10% by mass or exceeds about 10% by mass, since the monocarbodiimide compound is a low-molecular weight component, there is a concern that the flame retardancy is lowered.

<Flame Retardant>

The resin composition according to the present exemplary embodiment may contain a flame retardant. When the resin composition contains the flame retardant, when formed into a molded article, the flame retardancy is enhanced. The flame retardant is not particularly limited, and those which are generally used as a flame retardant for resins are useful. Examples thereof include inorganic flame retardants and organic flame retardants. Specific examples of the inorganic flame retardant include magnesium hydroxide, aluminum hydroxide, silicon dioxide and silica based flame retardants such as low-melting glasses; and specific examples of the organic flame retardant include phosphoric acid salt compounds and phosphoric ester compounds. Of the above-exemplified materials, flame retardants having a melting temperature of 200° C. or higher or about 200° C. or higher are preferable as the flame retardant which is used in the present exemplary embodiment from the standpoints of steel ball drop test characteristic, flame retardancy and so on. For example, flame retardants having no melting temperature are exemplified; and in particular, from the standpoint of flame retardant efficiency or the like, phosphoric acid salt compounds, especially ammonium polyphosphate are preferable.

When the resin composition contains a solid flame retardant having a melting temperature of 200° C. or higher or about 200° C. or higher, in the case of forming into a molded article, the flame retardancy is enhanced. However, when the solid flame retardant is contained in the resin composition, in general, in the case of a polylactic acid-containing resin composition, there is a concern that the steel ball drop test characteristic is largely deteriorated. But, by combining such a polylactic acid-containing resin composition with a phosphazene compound and a monocarbodiimide compound, the steel ball drop test characteristic is kept or enhanced. When a flame retardant having a melting temperature not higher than a general molding temperature (200° C.) of a resin composition such that it is liquid at the molding temperature of the resin composition is used, there is a concern that an elastic modulus of a resin molded article is lowered, and the steel ball drop test characteristic is lowered.

In this specification, the melting temperature of the flame retardant is measured by the DSC method using a differential scanning calorimeter (EXSTAR DSC6000 Model, manufactured by SII).

As the flame retardant, a synthesized material may be used, or a commercially available material may be used. Examples of the commercially available material include "AP422", manufactured by Clariant; "TERRJU C80", manufactured by Chemische Fabrik Budenheim KG; and "APP1", manufactured by Dalian Chem Imp. & Exp. Group Co., Ltd., all of which are ammonium polyphosphate. Also, the flame retardant may be used singly or in combinations of two or more kinds thereof.

Though a content of the flame retardant is not particularly limited, it is preferably from 5% by mass to 50% by mass or from about 5% by mass to about 50% by mass, and more preferably from 10% by mass to 40% by mass or from about 10% by mass to about 40% by mass on the basis of the whole amount of solids of the resin composition. When the content of the flame retardant is less than 5% by mass or less than about 5% by mass, in the case of forming into a molded article, there is a concern that the flame retardancy is not sufficiently obtainable; whereas when it exceeds 50% by mass or exceeds about 50% by mass, there is a concern that dispersibility of the resin composition is lowered. In the resin molded article, though a content of the flame retardant is not particularly limited, it is preferably from 5% by mass to 50% by mass or from about 5% by mass to about 50% by mass, and more preferably from 10% by mass to 40% by mass or from about 10% by mass to about 40% by mass on the basis of the mass of the whole of the resin molded article. When the content of the flame retardant is less than 5% by mass or less than about 5% by mass, there is a concern that the flame retardancy is not sufficiently obtainable; whereas when it exceeds 50% by mass or exceeds about 50% by mass, there is a concern that mechanical physical properties of the molded article are largely lowered.

<Rubber Material>

The resin composition according to the present exemplary embodiment may contain a rubber material. When the resin composition contains the rubber material, in the case of forming a molded article, the steel ball drop test characteristic is enhanced. Examples of the rubber material include silicone/acrylic composite rubbers, acrylic rubbers, butadiene based rubbers and natural rubbers. Of these, acrylic rubber materials are preferable from the standpoints of easy compatibility with the polylactic acid, flame retardancy, steel ball drop test characteristic and so on.

As the polylactic acid, a synthesized material may be used, or a commercially available material may be used. Examples of the commercially available material include "W600A", manufactured by Mitsubishi Rayon Co., Ltd.; and "BPM500", manufactured by Rohm and Haas Company, all of which are an acrylic rubber material. Also, the rubber material may be used singly or in combinations of two or more kinds thereof.

Though a content of the rubber material is not particularly limited, it is preferably from 1% by mass to 20% by mass or from about 1% by mass to about 20% by mass, and more preferably from 3% by mass to 15% by mass or from about 3% by mass to about 15% by mass on the basis of the whole amount of solids of the resin composition. When the content of the rubber material is less than 1% by mass or less than 1% by mass, in the case of forming into a molded article, there is a concern that the steel ball drop test characteristic is lowered; whereas when it exceeds 20% by mass or exceeds about 20% by mass, in the case of forming into a molded article, there is a concern that the flame retardancy is not sufficiently obtainable. In the resin molded article, though a content of the rubber material is not particularly limited, it is preferably from 1% by mass to 20% by mass or from about 1% by mass to about 20% by mass, and more preferably from 3% by mass to 15% by mass or from about 3% by mass to about 15% by mass on the basis of the whole of the resin molded article. When the content of the rubber material is less than 1% by mass or less than about 1% by mass, there is a concern that the steel ball drop test characteristic is lowered; whereas when it exceeds 20% by mass or exceeds about 20% by mass, there is a concern that the flame retardancy is not sufficiently obtainable.

<Drip Preventing Agent>

The resin composition according to the present exemplary embodiment may contain a drip preventing agent. When the resin composition contains the drip preventing agent, in the case of forming into a molded article, the drip resistance (resistance to melt dripping) is enhanced.

As the drip preventing agent, a synthesized material may be used, or a commercially available material may be used. Examples of the commercially available material include "PTFE CD145", manufactured by Asahi Glass Co., Ltd.; and "FA500H", manufactured by Daikin Industries, Ltd., all of which are polytetrafluoroethylene. Also, the drip preventing agent may be used singly or in combinations of two or more kinds thereof.

Though a content of the drip preventing agent is not particularly limited, it is preferably from 0.01% by mass to 5% by mass, and more preferably from 0.05% by mass to 1% by mass on the basis of the whole weight of the resin composition. When the content of the drip preventing agent is less than 0.01% by mass, there is a concern that a drip preventing effect becomes small; whereas when it exceeds 5% by mass, there is a concern that the flame retardancy is deteriorated.

In the resin composition and the resin molded article obtained using the resin composition, by measuring the structure and composition ratio of each of the materials using an elemental analyzer, an NMR apparatus, an IR apparatus or the like, from the contents of the polylactic acid, phosphazene compound, monocarbodiimide compound, flame retardant, rubber material and drip preventing agent in the resin composition and the resin molded article, the contents of the polylactic acid, phosphazene compound, monocarbodiimide compound, flame retardant, rubber material and drip preventing agent in the resin composition and in the resin molded article can be determined.

A weight average molecular weight of the polylactic acid in the resin composition is measured by the foregoing method upon separating the polylactic acid from the composition. A weight average molecular weight of the polylactic acid in the resin molded article obtained using the resin composition is measured by the foregoing method.

A glass transition temperature of the polylactic acid and a melting temperature of the phosphazene compound in the resin composition are measured by the DSC method using a differential scanning calorimeter (EXSTAR DSC6000 Model, manufactured by SII). A glass transition temperature of the polylactic acid and a melting temperature of the phosphazene compound in the resin molded article obtained using the resin composition are similarly measured upon separating each of the materials and extracting it.

<Other Components>

The resin composition according to the present exemplary embodiment may further contain other components such as an additive, for example, a compatibilizing agent, an antioxidant, a reinforcing agent, a weather-resistant agent, a hydrolysis preventing agent, etc.; and a catalyst, if desired. A content of such other components is preferably 10% by mass or less as a whole on the basis of the whole amount of solids of the resin composition.

<Manufacturing Method of Resin Composition>

The resin composition according to the present exemplary embodiment may be, for example, prepared by kneading the polylactic acid, the monocarbodiimide compound and the phosphazene compound and optionally, the flame retardant, the rubber material and the drip preventing agent and also other components.

Kneading may be, for example, performed using a known kneader such as a twin-screw kneader (for example, TEM58SS, manufactured by Toshiba Machine Co., Ltd.) and a simple kneader (for example, LABO PLASTOMILL, manufactured by Toyo Seiki Seisaku-Sho Co., Ltd.). Here, for example, a temperature condition for kneading (cylinder temperature condition) is preferably in the range of from 170° C. to 250° C., and more preferably in the range of from 180° C. to 240° C. According to this, a molded article which is excellent in the steel ball test characteristic is easily obtainable.

[Resin Molded Article]

The resin molded article according to the present exemplary embodiment is, for example, obtained by molding the foregoing resin composition according to the present exemplary embodiment. The resin molded article according to the present exemplary embodiment is, for example, obtained by performing molding by a molding method such as injection molding, extrusion molding, blow molding and heat press molding.

The injection molding may be, for example, performed using a commercially available apparatus such as "NEX150", manufactured by Nissei Plastic Industrial Co., Ltd.; "NEX70000", manufactured by Nissei Plastic Industrial Co., Ltd.; and "SE50D", manufactured by Toshiba Machine Co., Ltd. On that occasion, from the viewpoint of suppression of decomposition of the resin or the like, a cylinder temperature is preferably in the range of from 170° C. to 250° C., and more preferably in the range of from 180° C. to 240° C. Also, from the viewpoint of productivity or the like, a die temperature is preferably in the range of from 30° C. to 100° C., and more preferably in the range of from 30° C. to 60° C.

<Parts of Electronic or Electrical Instruments>

Since the resin molded article according to the present exemplary embodiment is able to become excellent in mechanical strength (for example, a steel ball drop test characteristic, etc.), it is suitably used for applications such as electronic or electrical instruments, household appliances, containers and automobile interior finishing materials. More specifically, the resin molded article according to the present exemplary embodiment is useful for casings and various parts of household appliances or electronic or electrical instruments, wrapping films, storage cases of CD-ROMs or DVDs, tableware, food trays, drink bottles, drug wrapping materials and so on. In particular, the resin molded article according to the present exemplary embodiment is suitable for parts of electronic or electrical instruments. The parts of electronic or electrical instruments often have a complicated shape and are often heavy, so that they are required to have a high steel ball drop test characteristic as compared with the case where the weight is not heavy. Meanwhile, the resin molded article according to the present exemplary embodiment sufficiently satisfies such requirements. The resin molded article according to the present exemplary embodiment is especially suitable for casings of an image forming apparatus, a copier and so on.

EXAMPLES

The invention is hereunder more specifically described in detail with reference to the following Examples and Comparative Examples, but it should not be construed that the invention is limited to these Examples.

Examples 1 to 11

Each of compositions of Examples 1 to 11 shown in Table 1 is kneaded using a twin-screw kneader (TEM58SS, manufactured by Toshiba Machine Co., Ltd.) at a cylinder temperature 190° C., thereby obtaining resin composition pellets. The obtained pellets are molded into a UL specimen for V test (thickness: 1.6 mm) and a specimen for steel ball drop test (thickness: 2 mm), respectively using an injection molding machine (NEX150, manufactured by Nissei Plastic Industrial Co., Ltd.) at a cylinder temperature of 190° C. and a die temperature of 110° C.

Comparative Examples 1 to 5

Each of compositions of Comparative Examples 1 to 5 shown in Table 1 is treated in the same manner as in the Examples, thereby obtaining resin composition pellets, followed by performing injection molding to obtain specimens.

Also, with respect to the respective components shown in Table 1, trade names, manufacturers, physical properties and so on are shown in Table 2.

<Measurement and Evaluation>

The following respective measurements and evaluations are performed using the obtained specimens. The results are shown in Table 1.

(Evaluation of Flame Retardancy (UL94)>

The UL-94 horizontal and vertical burning test is performed using each of the foregoing UL specimens. In the results of the burning test, the level becomes high in the order of V0→V1→V2→HB.

(Steel Ball Drop Test)

A steel ball having a diameter of 50 mm and a weight of 500 g is dropped on and collided with a test piece fixed to an SUS-made jig under a condition at a temperature of 25° C. and a humidity of 50%, and a height at which breakage of the test piece is generated is evaluated as resistance to steel ball drop. In order to evaluate the test piece in a state where it is closer to a part, the test is performed using a test piece 10 shown in FIG. 1A, 1B. The results are shown in Table 1.

A: When the steel ball is dropped at a height of 70 cm, the test piece is not broken.
B: When the steel ball is dropped at a height of 70 cm, the test piece is broken.
C: When the steel ball is dropped at a height of 50 cm, the test piece is broken.
D: When the steel ball is dropped at a height of 30 cm, the test piece is broken.

TABLE 1

|  | Polylactic acid | | Monocarbodiimide compound | | Phosphazene compound | | Flame retardant | | Rubber material | | Drip preventing agent | | Steel ball drop characteristic | Flame retardancy |
|---|---|---|---|---|---|---|---|---|---|---|---|---|---|---|
| Example 1 | A1 | 100 | C1 | 1.5 | B1 | 10 | D1 | 30 | E1 | 6 | F1 | 0.2 | A | V0 |
| Example 2 | A2 | 100 | C2 | 2 | B1 | 15 | D2 | 25 | E1 | 6 | F1 | 0.2 | A | V0 |
| Example 3 | A1 | 100 | C1 | 3 | B2 | 4 | D1 | 40 | E1 | 3 | F1 | 0.2 | C | V0 |
| Example 4 | A1 | 100 | C1 | 2 | B1 | 15 | D1 | 25 | — | | F1 | 0.2 | C | V1 |
| Example 5 | A1 | 100 | C1 | 0.5 | B2 | 20 | D1 | 25 | E1 | 3 | F1 | 0.2 | C | V1 |
| Example 6 | A2 | 100 | C3 | 6 | B1 | 35 | — | | E1 | 3 | — | | A | V2 |
| Example 7 | A1 | 100 | C1 | 1.5 | B2 | 10 | — | | — | | — | | B | HB |
| Example 8 | A1 | 100 | C2 | 1 | B1 | 10 | — | | E1 | 3 | F1 | 0.2 | B | HB |
| Example 9 | A2 | 100 | C1 | 3 | B1 | 15 | — | | E1 | 3 | F1 | 0.2 | B | HB |
| Example 10 | A1 | 100 | C1 | 1 | B1 | 5 | D3 | 30 | E1 | 3 | F1 | 0.2 | C | V2 |
| Example 11 | A1 | 100 | C1 | 2 | B1 | 10 | D1 | 40 | E2 | 5 | F1 | 0.2 | B | V0 |
| Comparative Example 1 | A1 | 100 | | — | B1 | 14 | — | | — | | — | | D | V2 |
| Comparative Example 2 | A1 | 100 | C1 | 2 | | — | D1 | 40 | — | | F1 | 0.2 | D | V0 |
| Comparative Example 3 | A1 | 100 | | — | B1 | 8 | D1 | 33 | — | | F1 | 0.2 | D | V1 |
| Comparative Example 4 | A1 | 100 | C2 | 3 | | — | D2 | 15 | E1 | 5 | F1 | 0.2 | D | HB |
| Comparative Example 5 | A1 | 100 | C4 | 3 | B1 | 14 | — | | E1 | 5 | F1 | 0.2 | D | HB |

TABLE 2

| | | Trade name | Manufacturer | Remarks (chemical name, physical properties, etc.) |
|---|---|---|---|---|
| Polylactic acid | A1 | TE7000 | Unitika Ltd. | |
| | A2 | TE2000 | Unitika Ltd. | |
| Phosphazene compound | B1 | FP-110 | Fushimi Pharmaceutical Co., Ltd. | |
| | B2 | SP-100 | Otsuka Chemical Co., Ltd. | |
| Monocarbodiimide compound | C1 | STABAXOL I-LF | Rhein Chemie | Carbodiimide compound |
| | C2 | N,N'-Diisopropyl carbodiimide | Tokyo Chemical Industry Co., Ltd. | |
| | C3 | N,N'-Dicyclohexyl carbodiimide | Tokyo Chemical Industry Co., Ltd. | |
| | C4 | CARBODILITE LA1 | Nisshinbo Holdings Inc. | Polyfunctional compound |
| Flame retardant | D1 | AP422 | Clariant | Having no melting temperature |
| | D2 | TERRJU C80 | Chemische Fabrik Budenheim KG | Having no melting temperature |
| | D3 | PX200 | Daihachi Chemical Industry Co., Ltd. | Melting temperature: 90° C. |
| Rubber material | E1 | W600A | Mitsubishi Rayon Co., Ltd. | Acrylic rubber material |
| | E2 | SX005 | Mitsubishi Rayon Co., Ltd. | Silicone-acrylic rubber material |
| Drip preventing agent | F1 | PTFE CD145 | Asahi Glass Co., Ltd. | |

It is noted from Table 1 that when the monocarbodiimide compound and the phosphazene compound are added to the polylactic acid, in the case of forming into a molded article, the steel ball drop test characteristic is enhanced as compared with the Comparative Examples. Also, when the flame retardant, in particular, the flame retardant having no melting temperature is used jointly, the flame retardancy comparable to the prescribed standards is obtainable. It is evident from the foregoing results that when formed into a molded article, the resin composition according to the present exemplary embodiment is excellent in the steel ball drop test characteristic and is especially suitable for the manufacture of a casing of image forming apparatus. Also, the resin molded article according to the present exemplary embodiment is excellent in the steel ball drop test characteristic and is especially suitable for the manufacture of a casing of image forming apparatus.

What is claimed is:

1. A resin composition, comprising:
   a resin, wherein the resin present in the resin composition is only a polylactic acid and an acrylic rubber material, and a content of the acrylic rubber material is from 3% by mass to 15% by mass on the basis of a whole amount of solids of the resin composition;
   a carbodiimide compound, wherein the only carbodiimide compound present in the resin composition is a monocarbodiimide compound and a content of the monocarbodiimide compound is from about 1% by mass to about 5% by mass on the basis of the whole amount of solids of the resin composition;
   a phosphazene compound, wherein a content of the phosphazene compound is from about 5% by mass to about 50% by mass on the basis of the whole amount of solids of the resin composition; and
   a flame retardant having a melting temperature of about 200° C. or higher.

2. The resin composition according to claim 1, wherein the flame retardant is a phosphoric acid salt compound.

3. The resin composition according to claim 1, wherein a content of the polylactic acid is from about 30% by mass to about 90% by mass on the basis of the whole amount of solids of the resin composition.

4. The resin composition according to claim 1, wherein a content of the flame retardant is from about 5% by mass to about 50% by mass on the basis of the whole amount of solids of the resin composition.

5. A resin molded article, comprising:
   a resin, wherein the resin present in the resin molded article is only a polylactic acid and an acrylic rubber material, and a content of the acrylic rubber material is from 3% by mass to 15% by mass on the basis of a mass of a whole of the resin molded article;
   a carbodiimide compound, wherein the only carbodiimide compound present in the resin molded article is a monocarbodiimide compound and a content of the monocarbodiimide compound is from about 1% by mass to about 5% by mass on the basis of the mass of the whole of the resin molded article;
   a phosphazene compound, wherein a content of the phosphazene compound is from about 5% by mass to about 50% by mass on the basis of the mass of the whole of the resin molded article; and
   a flame retardant having a melting temperature of about 200° C. or higher.

6. The resin molded article according to claim 5, wherein the flame retardant is a phosphoric acid salt compound.

7. The resin molded article according to claim 5, wherein a content of the polylactic acid is from about 30% by mass to about 90% by mass on the basis of the mass of the whole of the resin molded article.

8. The resin molded article according to claim 5, wherein a content of the flame retardant is from about 5% by mass to about 50% by mass on the basis of the mass of the whole of the resin molded article.

9. The resin molded article according to claim 5, which is a part of electronic or electrical instrument.

10. A resin composition consisting essentially of:
    a resin that is only a polylactic acid and an acrylic rubber material, wherein a content of the acrylic rubber material is from 3% by mass to 15% by mass on the basis of a whole amount of solids of the resin composition;
    a monocarbodiimide compound in a content of from about 1% by mass to about 5% by mass on the basis of the whole amount of solids of the resin composition;
    a phosphazene compound in a content of from about 5% by mass to about 50% by mass on the basis of the whole amount of solids of the resin composition;
    a flame retardant having a melting temperature of about 200° C. or higher; and
    optionally a drip preventing agent.

* * * * *